United States Patent
Cochran et al.

[11] Patent Number: 6,164,319
[45] Date of Patent: Dec. 26, 2000

[54] AUTOMATIC SHUT-OFF DEVICE FOR A PIPE

[76] Inventors: David J. Cochran, 3156 Ellis Rd., Richmond, Kans. 66080; Forrest R. Cloud, 10475 Deerfield, Olathe, Kans. 66061

[21] Appl. No.: 09/280,407

[22] Filed: Mar. 29, 1999

Related U.S. Application Data

[63] Continuation-in-part of application No. 08/833,325, Apr. 4, 1997, abandoned.

[51] Int. Cl.$^7$ ..................................................... F16K 31/02
[52] U.S. Cl. .................. 137/487.5; 137/486; 137/624.11
[58] Field of Search .............................. 137/486, 487.5, 137/624.11, 460, 495

[56] References Cited

U.S. PATENT DOCUMENTS

| | | |
|---|---|---|
| 999,950 | 8/1911 | Berthelot et al. . |
| 1,401,887 | 12/1921 | Davis . |
| 1,894,449 | 1/1933 | Sandvoss . |
| 4,589,435 | 5/1986 | Aldrich . |
| 5,038,820 | 8/1991 | Ames et al. . |
| 5,056,554 | 10/1991 | White . |
| 5,086,806 | 2/1992 | Engler et al. . |
| 5,091,612 | 2/1992 | Van Fossen . |
| 5,251,653 | 10/1993 | Tucker et al. ......................... 137/487.5 |
| 5,267,587 | 12/1993 | Brown . |
| 5,327,473 | 7/1994 | Weigert . |
| 5,568,825 | 10/1996 | Faulk ................................. 137/624.11 |

*Primary Examiner*—Gregory L. Huson
*Assistant Examiner*—Ramesh Krishnamurthy
*Attorney, Agent, or Firm*—Shughart Thomson & Kilroy P.C.

[57] ABSTRACT

An automatic shut-off device for a fluid carrying pipe includes a flow sensor switch housing which is connectable in line with the pipe. A sensor switch is included in the housing, which switch is operated by a switch paddle positioned within the housing in the path of fluid flow there through. A venturi is inserted with an inlet diameter positioned proximate an inlet end of the housing and the venturi has an outlet with a smaller outlet diameter positioned proximate the switch paddle. The venturi both speeds up the flow of liquid through the housing and directs the flow onto the paddle, both of which increase sensitivity of the switch. The venturi is designed to be either left intact or cut off when installed to allow the sensitivity of the flow sensor switch to be adjusted upon installation. An adjustable timer circuit is connected to the flow control relay, which timer circuit is responsive to the flow sensor relay to start a variable time-out period after which the relay control circuit closes a valve to shut off fluid flow through the pipe. If the flow ceases during the time-out period, the timer is reset and the cycle starts anew.

16 Claims, 3 Drawing Sheets

AUTOMATIC SHUT-OFF DEVICE FOR A PIPE

CROSS REFERENCE TO RELATED APPLICATIONS

This application is a continuation-in-part of application Ser. No. 08/833,325, filed Apr. 4, 1997, and entitled AUTOMATIC SHUT-OFF DEVICE FOR A PIPE, now abandoned.

FIELD OF THE INVENTION

The present invention relates to a device for automatically shutting off fluid in case of a leak, and, more particularly, to such an automatic shut-off device which includes a flow detecting paddle positioned proximate a venturi positioned within the pipe. The venturi both increases the speed of the fluid flow and directs fluid onto the paddle. The paddle operates a switch which starts a timer which, upon time-out, triggers a relay which shuts a valve, stopping fluid flow through the pipe. Sensitivity of the flow detector can be adjusted upon installation by altering the venturi to move its outlet further from the paddle.

BACKGROUND OF THE INVENTION

Pipes containing fluid under pressure are prone to leak from a number of causes, including corrosion, freezing, deterioration of fixtures, etc. This is of particular concern in a household residence where protracted leakage of plumbing pipes can cause much property damage to the structure and contents. A number of systems have been devised to automatically shut off water in a plumbing system in the event of a leak. One example is found in U.S. Pat. No. 5,038,820 to Phillip Ames, et al. This system uses a "pivotal flapper" positioned within a pipe, which flapper is pivoted upward due to water flow in the pipe. The flapper then operates a switch which starts a timer which, in turn, operates a motor to control a valve after the expiration of a preset time period. Another example is found in U.S. Pat. No. 4,589,435 to Aldrich, which is very similar in that it uses a probe positioned within a pipe and which is moved by fluid flow to trigger a timing circuit. The timer, in turn, controls a solenoid which closes off a valve to shut down fluid flow after a preset time period. Neither the Ames or the Aldrich patent allows their systems to be set to be triggered at different flow rates. This is a problem, for example, where it is desirable to allow a certain minimal flow volume for humidifiers, ice makers, etc., but to shut off in response to a larger flow volume. In addition, both Ames or Aldrich are relatively complex systems which makes them expensive.

It is clear, then, that an improved automatic shut-off device for closing plumbing or other fluid carrying pipes is needed. Such a device should preferably be simple and inexpensive, but be capable of adjustment to allow for different flow thresholds upon installation.

SUMMARY OF THE INVENTION

The present invention is an automatic shut-off device for plumbing or other fluid carrying pipe systems. The device includes a flow sensor housing which is connectable in line with a fluid carrying pipe. The housing has a fluid inlet end connecting with an internal fluid carrying chamber which chamber also connects with a fluid outlet. The fluid chamber also has a branch which extends perpendicular to the path between fluid inlet and fluid outlet, and a sensor switch is positioned on the branch with a switch operating paddle extending downward into the flow path of the fluid carrying chamber. A venturi is inserted proximate the housing fluid inlet and has an outlet positioned proximate the switch paddle. The venturi both speeds up the flow of liquid through the housing and directs the flow onto the paddle, both of which increase sensitivity of the switch. The venturi is designed to be either left intact or cut off when installed to allow it the sensitivity of the flow sensor to be adjusted upon installation.

The flow sensor switch is connected to an adjustable timer and a timer and relay control circuit which is responsive to the flow sensor to start a variable time-out period after which the relay control circuit closes a valve to shut off fluid flow through the pipe. If the flow ceases during the time-out period, the timer is reset and the cycle starts anew.

OBJECTS AND ADVANTAGES OF THE INVENTION

The objects and advantages of the invention include: providing an automatic shut-off device for a fluid carrying pipe, such as a residential plumbing supply; providing such an automatic shut-off device in which a flow sensing switch is operable to start a timer which measures a time-out period after which a shut-off valve solenoid and shut-off valve is actuated to cut off flow through the pipe; providing such an automatic shut-off device in which a flow sensing switch housing with a switch operating paddle are positioned in line with the pipe; providing such an automatic shut-off device in which a venturi is positioned within a fluid inlet of the switch housing to direct and concentrate fluid flow onto the paddle; providing such an automatic shut-off device in which the venturi is adjustable in length upon installation of the device to adjust the sensitivity of the flow sensing switch; providing such an automatic shut-off device in which a unique relay latching circuit insures that the shut-off valve solenoid remains latched regardless of flow sensor switch position; providing such an automatic shut-off device in which the time-out period is easily and conveniently adjustable; and providing such an automatic shut-off device which is economical and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
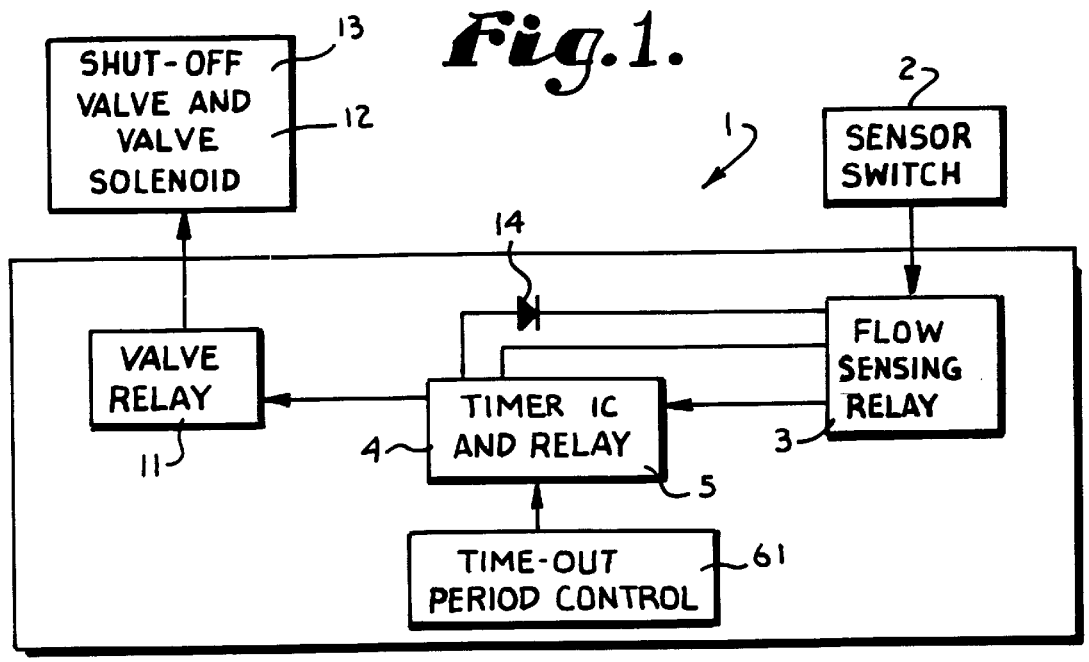
FIG. 1 is a block schematic diagram of the automatic shut-off device according to the present invention.

Referring to the drawings, and particularly FIG. 1, an automatic shut-off device for fluid pipes in accordance with the present invention is illustrated and generally indicated at 1. The automatic shut-off device 1, illustrated in block diagram form in FIG. 1, includes a sensor switch 2, a flow sensing relay 3, a variable timer circuit 4 and timer relay 5. The timer circuit 4 controls a valve relay 11, which, in turn, operates a shut-off valve solenoid 12 and shut-off valve 13. A latching diode 14, as explained more fully below, is connected to the flow sensing relay 3 to maintain it in a latched condition after the shut-off valve 13 is operated.

Figure 2:
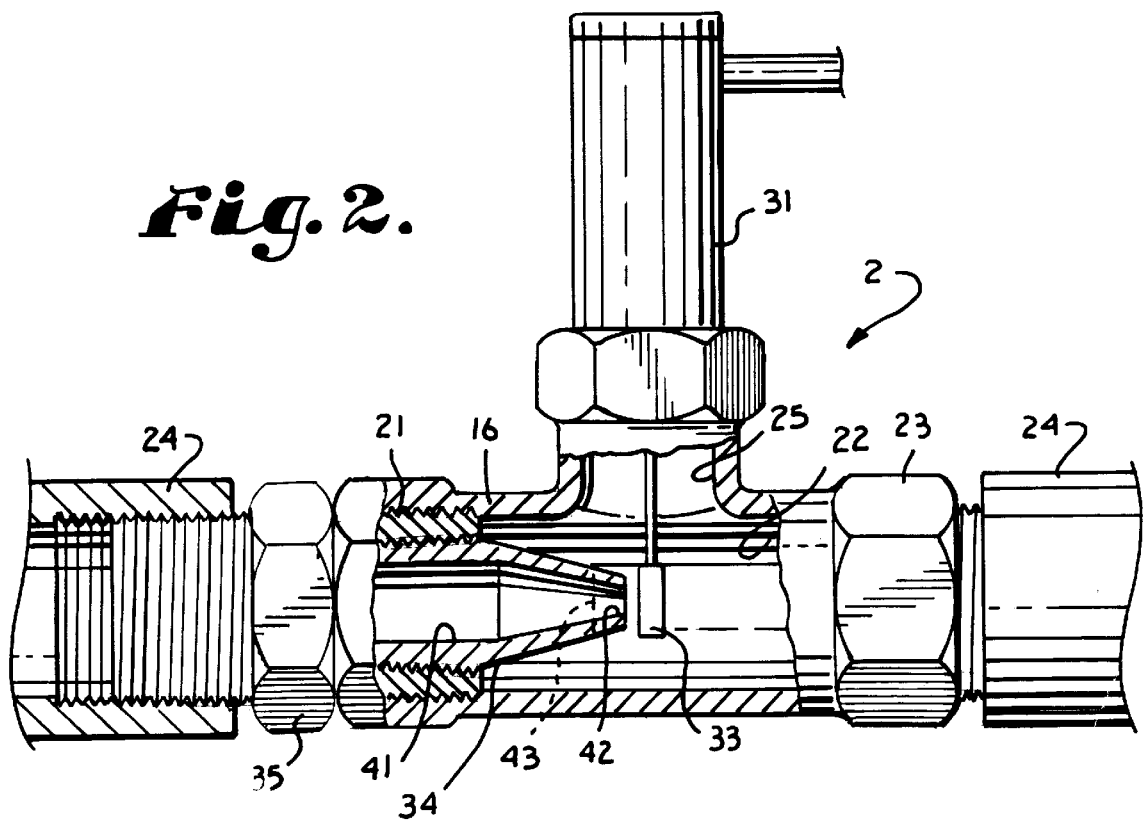
FIG. 2 is a front elevational view of the flow sensing switch with portions of the switch housing broken away to illustrate placement of a venturi and alteration of the venturi to adjust switch sensitivity.

Referring to FIG. 2, the flow sensor switch 2 is illustrated, and generally indicated at 2. The flow sensor switch 2 includes a switch housing 16 with a threaded fluid inlet end 21 connecting with an internal fluid carrying chamber 22, which chamber 22 also connects with a threaded fluid outlet 23. The inlet end 21 and the outlet end 23 are connected, in line, into a fluid carrying pipe 24, such as a residential plumbing supply pipe. The fluid chamber 22 also branches upward to form a threaded T leg 25 which accommodates a switch sensor module 31. The switch sensor module 31 includes a switch 32 (FIG. 3) and a switch operating paddle 33 which extends downward from the module 31 and into the chamber 22 into the flow path of fluid moving through the pipe 24.

A venturi 34 has a portion of its outer surface which is externally threaded and is received within one end of an internally and externally threaded pipe nipple 35, which itself is threaded into the fluid inlet end 21 of the housing 16. The supply pipe 24 is then threadably received within the other end of the pipe nipple 35. The venturi 34 also has a non-threaded, free-standing portion which projects from the pipe nipple 35 into the chamber 22. The venturi 34 tapers downward from a first diameter at a fluid inlet opening 41 to a final, smaller outlet diameter at a fluid outlet opening 42 which is positioned immediately proximate the switch paddle 33. The venturi 34 both increases the velocity of the flow of liquid through the housing 16 and directs the flow onto the paddle 33, both of which increase sensitivity of the switch 32. The venturi 34 is designed to be either left intact, i.e. with the venturi outlet position immediately proximate the paddle 33, or cut off at the dotted line 43, when installed. If the venturi 34 is cut off at the dotted line 43, the outlet opening of the venturi 34 is moved further away from the paddle 33, thus decreasing the sensitivity of the flow sensor switch 2 upon installation. For example, when the venturi 34 is left intact, as shown, the flow sensor switch 2 will be triggered with fluid flow volumes of less than 0.2 Gallons Per Hour. By contrast, with the venturi 34 cut off at the dotted line 43, a flow of 1 gallon per hour is required in order to move the paddle 33 far enough to trigger the switch 2. Thus, by cutting off the venturi 34 at the dotted line, small flows of liquid will be allowed without triggering the automatic shut-off device 1, to permit humidifiers, ice makers and other low volume appliances to operate in the owner's absence. However, larger volume flows, which would indicate a leak or other unwanted situation, would trigger the switch 2.

Figure 3:
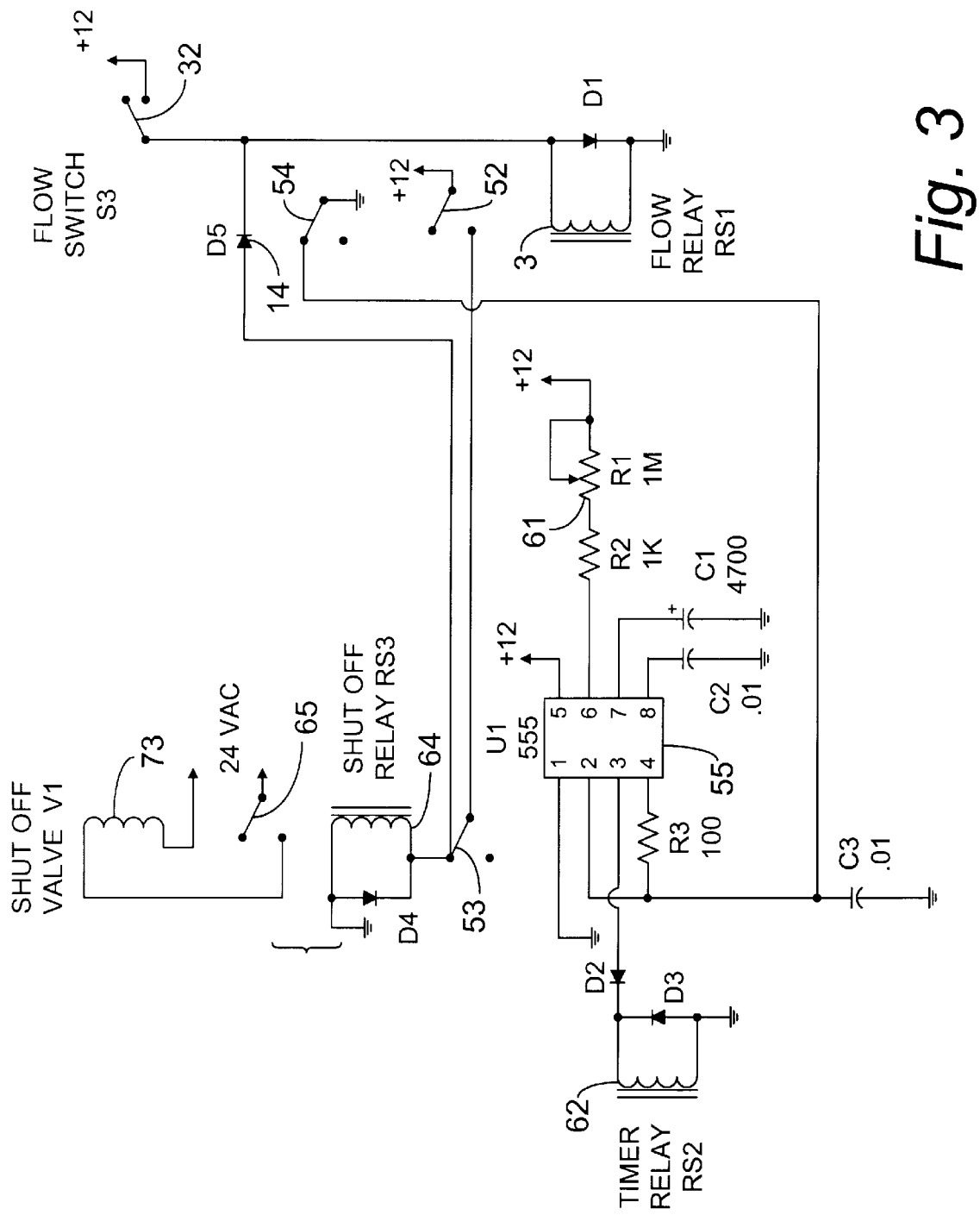
FIG. 3 is an electrical schematic of the automatic shut-off device of FIG. 1.

Referring to FIGS. 1 and 3, the flow sensor switch 2, when closed, connects 12 volts DC to the flow sensing relay 3, which then closes a first flow sensing relay switch 52 to supply 12 volts DC across atimer relay switch 53. A second flow sensing relay switch 54 is also opened to unground pin 2 of a timer circuit 55, which can be, for example, a standard 555 U1 solid state timer. This starts the timer circuit 55, which measures a time-out period which has been preset via a time-out period control rheostat 61, connected to timer pin 7. If fluid flow ceases at any time during the time-out period, the flow sensor switch 2 opens, cutting off current to the flow sensing relay 3, which causes the second flow sensing relay switch 54 to close, grounding the timer pin 7 and resetting the timer circuit 55. The timer circuit 55 can be varied by the rheostat 61 from a time-out period as small as 15 seconds, all the way to 2 hours or more. For example, the time-out period might be set for 15 seconds if the house were to be unoccupied for a considerable time, and thus no significant water usage were expected. By contrast, if the house were occupied, and an automatic sprinkling system installed, the time-out period might be set to 2 hours, a period longer than the sprinkling cycle.

When the preset time-out period is reached, the timer circuit 55 supplies 12 volts DC across a timer relay 62, which closes the timer relay switch 53. The closed timer relay switch 53 supplies 12 volts DC, via the flow sensing relay switch 52 across ashut-off relay 64, which then closes shut off relay switch 65. At the same time, the closed timer relay switch 53 supplies 12 volts DC to the anode of the latching diode 14, which is connected to the flow sensing relay 3 to keep it latched after fluid flow ceases to insure that the timer circuit 55 is not reset.

The shut-off relay 64 closes a shut-off relay switch 65, which supplies 24 V AC across a shut-off valve solenoid 73, which, in turn, closes a shut-off valve 13, illustrated in block diagram form only. The shut-off valve 13 can take any suitable form, such as a rotatable ball valve.

By contrast, if fluid flow should cease or diminish to the point that the flow sensing switch 2 is opened during the time-out period, the flow sensing relay 3 is released, opening the flow sensing switch 54, and removing ground from the timer pin 2. This resets the timer circuit 55 and the cycle starts anew.

Figure 4:
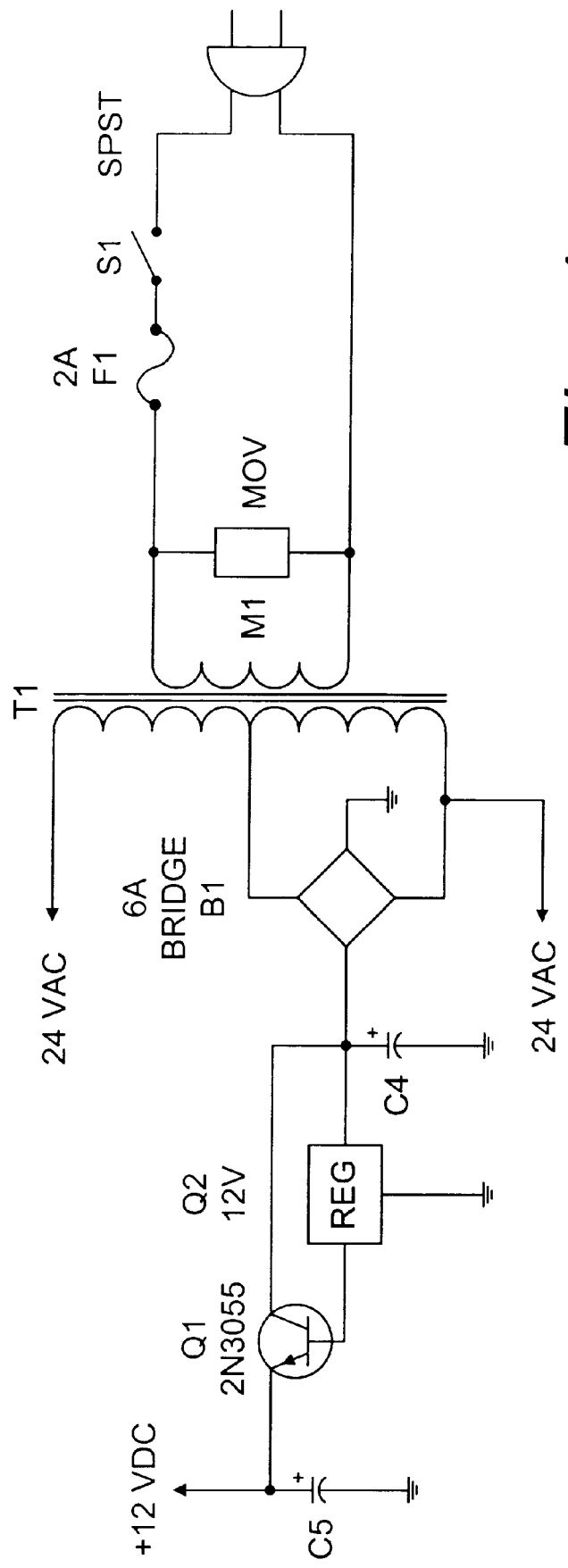
FIG. 4 is an electrical schematic of a power supply for supplying power to the circuit of FIG. 3.

FIG. 4 illustrates a typical power supply circuit for supplying 12 V DC and 24 V AC to the circuit of FIG. 3, and will not be further described.

While the automatic shut-off device 1 has been illustrated and described in a preferred embodiment, numerous variations will occur to one of ordinary skill in the art. For example, other methods of adjusting the relative positions of the outlet opening 42 of the venturi 34 could be adjusted in position by merely threading the venturi 34 further into or out of the pipe nipple 21. Alternatively, if the position of the venturi 34 were made adjustable after installation, then the sensitivity of the automatic shut-off device could be adjusted "on the fly" rather being fixed upon installation. The position of the switch paddle 33 could also be made adjustable. Other variations will occur to those of ordinary skill in the art. It is thus to be understood that while certain forms of the present invention have been illustrated and described herein, it is not to be limited to the specific forms or arrangement described and shown.

We claim:

1. An automatic fluid shut-off device for a pipe, comprising:
   a) a flow sensing switch, including:
      i) a switch housing with a fluid chamber connected in series with the pipe via a fluid inlet and an outlet;

ii) a switch paddle positioned in said fluid chamber;
iii) a venturi with a fluid inlet opening with an inlet diameter positioned proximate said switch housing fluid inlet and a fluid outlet opening with an outlet diameter which is smaller than said inlet diameter, said fluid outlet opening being positioned proximate said switch paddle, said venturi tapering downward in inner diameter between said inlet diameter and said outlet diameter to both accelerate fluid flow through the venturi and direct the accelerated flow onto the switch paddle;
iv) a switch responsive to movement of said paddle by fluid flowing through said venturi to supply operating current to a flow sensing relay;

b) a variable timer circuit which is operative to supply operating current to a timer relay upon the expiration of a preset time-out period;

c) said flow sensing relay operating a first switch to supply a start signal to said variable timer circuit; and wherein d) said timer relay operates a switch to trigger a shut-off valve positioned to selectively shut off fluid flow through said pipe.

2. An automatic fluid shut-off device as in claim 1, and further comprising:
a) a time period adjustment mechanism connected to said timer circuit to allow said preset time-out period to be adjusted.

3. An automatic fluid shut-off device as in claim 2, wherein said time period adjustment mechanism comprises a rheostat.

4. An automatic fluid shut-off device as in claim 1, wherein the sensitivity of said flow sensing switch is adjustable by varying the relative positions of said venturi fluid outlet opening and said switch paddle.

5. An automatic fluid shut-off device as in claim 4, wherein said venturi is adjustable in length to change the proximity between the venturi outlet opening and said switch paddle.

6. An automatic fluid shut-off device as in claim 1, wherein said venturi includes:
a) an inlet end including said fluid inlet opening;
b) an outlet end including said fluid outlet opening;
c) an outer surface, said outer surface having a threaded portion extending from said inlet end to a medial point intermediate said inlet and outlet ends, said threaded portion being threadably connected to said switch housing; and
d) a free-standing portion extending from said medial point to said outlet end, said free-standing portion being adapted to be shortened by cutting so that the relative positions of said venturi fluid outlet opening and said switch paddle are variable, thereby providing an adjustment to the sensitivity of said flow sensing switch.

7. The automatic fluid shut-off device as in claim 6, wherein said free-standing portion of said outer surface tapers inwardly from said medial point to said outlet end.

8. The automatic fluid shut-off device as in claim 7, further including a line extending at least partially around said free-standing portion, said line providing a reference for a location at which said free standing portion may be cut to adjust the sensitivity of said flow sensing switch to a desired sensitivity.

9. An automatic fluid shut-off device for a pine, comprising:
a) a flow sensing switch, including:

i) a switch housing with a fluid chamber connected in series with the pipe via a fluid inlet and an outlet;
ii) a switch paddle positioned in said fluid chamber;
iii) a venturi with a fluid inlet opening with an inlet diameter positioned proximate said switch housing fluid inlet and a fluid outlet opening with an outlet diameter which is smaller than said inlet diameter, said fluid outlet opening being positioned proximate said switch paddle, said venturi tapering downward in inner diameter between said inlet diameter and said outlet diameter to both accelerate fluid flow through the venturi and direct the accelerated flow onto the switch paddle;
iv) a switch responsive to movement of said paddle by fluid flowing through said venturi to supply operating current to a flow sensing relay;

b) a variable timer circuit which is operative to supply operating current to a timer relay upon the expiration of a preset time-out period;

c) said flow sensing relay operating a first switch to supply a start signal to said variable timer circuit;

d) said timer relay operates a switch to trigger a shut-off valve positioned to selectively shut off fluid flow through said pipe;

e) a shut-off relay which is supplied with operating current upon closure of said timer relay switch to close a shut-off relay switch which supplies operating current to a shut-off valve solenoid, which, in turn, operates said shut-off valve to shut off fluid flow through said pipe; and f) a latching diode with an anode connected between said shut-off relay and said flow sensing relay, said latching diode supplying operating current to said flow sensing relay after said shut-off valve shuts off fluid flow in said pipe.

10. An automatic fluid shut-off device a pipe, comprising:
a) a flow sensing switch, including:
i) a switch housing with a fluid chamber connected in series with the pipe via a fluid inlet and an outlet;
ii) a switch paddle positioned in said fluid chamber;
iii) a venturi with a fluid inlet opening with an inlet diameter positioned proximate said switch housing fluid inlet and a fluid outlet opening with an outlet diameter which is smaller than said inlet diameter, said fluid outlet opening being positioned proximate said switch paddle, said venturi tapering downward in inner diameter between said inlet diameter and said outlet diameter to both accelerate fluid flow through the venturi and direct the accelerated flow onto the switch paddle, wherein said venturi is adjustable in length to change the proximity between the venturi outlet opening and said switch paddle in order to change the sensitivity of said flow sensing switch; and
iv) a switch responsive to movement of said paddle by fluid flowing through said venturi to supply operating current to a flow sensing relay;

b) a variable timer circuit which is operative to supply operating current to a timer relay upon the expiration of a preset time-out period;

c) said flow sensing relay operating a first switch to supply a start signal to said variable timer circuit; and wherein d) said timer relay operates a switch to trigger a shut-off valve positioned to selectively shut off fluid flow through said pipe.

11. An automatic fluid shut-off device as in claim 10, and further comprising:

a) a time period adjustment mechanism connected to said timer circuit to allow said preset time-out period to be adjusted.

12. An automatic fluid shut-off device as in claim 11, wherein said time period adjustment mechanism comprises a rheostat.

13. An automatic fluid shut-off device for a pipe, comprising:
   a) a flow sensing switch, including:
      i) a switch housing with a fluid chamber connected in series with the pipe via a fluid inlet and an outlet;
      ii) a switch paddle positioned in said fluid chamber;
      iii) a venturi with a fluid inlet opening with an inlet diameter positioned proximate said switch housing fluid inlet and a fluid outlet opening with an outlet diameter which is smaller than said inlet diameter, said fluid outlet opening being positioned proximate said switch paddle, said venturi tapering downward in inner diameter between said inlet diameter and said outlet diameter to both accelerate fluid flow through the venturi and direct the accelerated flow onto the switch paddle, wherein said venturi is adjustable in length to change the proximity between the venturi outlet opening and said switch paddle in order to change the sensitivity of said flow sensing switch; and
      iv) a switch responsive to movement of said paddle by fluid flowing through said venturi to supply operating current to a flow sensing relay;
   b) a variable timer circuit which is operative to supply operating current to a timer relay upon the expiration of a preset time-out period;
   c) said flow sensing relay operating a first switch to supply a start signal to said variable timer circuit;
   d) said timer relay operating a switch to trigger a shut-off valve positioned to selectively shut off fluid flow through said pipe;
   e) a shut-off relay which is supplied with operating current upon closure of said timer relay switch to close a shut-off relay switch which supplies operating current to a shut-off valve solenoid, which, in turn, operates said shut-off valve to shut off fluid flow through said pipe; and
   f) a latching diode with an anode connected between said shut-off relay and said flow sensing relay, said latching diode supplying operating current to said flow sensing relay after said shut-off valve shuts off fluid flow in said pipe.

14. An automatic fluid shut-off device for a pipe, comprising:
   a) a flow sensing switch, including:
      i) a switch housing with a fluid chamber connected in series with the pipe via a fluid inlet and an outlet;
      ii) a switch paddle positioned in said fluid chamber;
      iii) a venturi with a fluid inlet opening with an inlet diameter positioned proximate said switch housing fluid inlet and a fluid outlet opening with an outlet diameter which is smaller than said inlet diameter, said fluid outlet opening being positioned proximate said switch paddle, said venturi tapering downward in inner diameter between said inlet diameter and said outlet diameter to both accelerate fluid flow through the venturi and direct the accelerated flow onto the switch paddle;
      iv) a switch responsive to movement of said paddle by fluid flowing through said venturi to supply operating current to a flow sensing relay;
   b) a variable timer circuit which is operative to supply operating current to a timer relay upon the expiration of a preset time-out period;
   c) a rheostat connected to said variable timer circuit, said rheostat being adjustable to vary said preset time-out period;
   d) said flow sensing relay operating a first flow sensing relay switch to supply a start signal to said variable timer circuit;
   e) said timer relay operating a timer relay switch;
   f) a shut-off relay which is supplied with operating current upon closure of said timer relay switch to close a shut-off relay switch which supplies operating current to a shut-off valve solenoid, which, in turn, operates a shut-off valve to shut off fluid flow through said pipe; and
   g) a latching diode with an anode connected between said shut-off relay and said flow sensing relay, said latching diode supplying operating current to said flow sensing relay after said shut-off valve shuts off fluid flow in said pipe.

15. An automatic fluid shut-off device as in claim 14, wherein the sensitivity of said flow sensing switch is adjustable by varying the relative positions of said venturi fluid outlet opening and said switch paddle.

16. An automatic fluid shut-off device as in claim 15, wherein said venturi is adjustable in length to change the proximity between the venturi outlet opening and said switch paddle.

* * * * *